United States Patent
Mamou et al.

(10) Patent No.: US 9,405,823 B2
(45) Date of Patent: Aug. 2, 2016

(54) SPOKEN DOCUMENT RETRIEVAL USING MULTIPLE SPEECH TRANSCRIPTION INDICES

(75) Inventors: Jonathan Joseph Mamou, Jerusalem (IL); Yosi Mass, Ramat Gan (IL)

(73) Assignee: Nuance Communications, Inc., Burlington, MA (US)

( * ) Notice: Subject to any disclaimer, the term of this patent is extended or adjusted under 35 U.S.C. 154(b) by 549 days.

(21) Appl. No.: 12/140,282

(22) Filed: Jun. 17, 2008

(65) Prior Publication Data

US 2009/0030894 A1 Jan. 29, 2009

Related U.S. Application Data

(63) Continuation-in-part of application No. 11/781,285, filed on Jul. 23, 2007.

(51) Int. Cl.
G06F 17/30 (2006.01)
G10L 15/26 (2006.01)

(52) U.S. Cl.
CPC .......... *G06F 17/30681* (2013.01); *G10L 15/26* (2013.01)

(58) Field of Classification Search
CPC .... G06F 17/30681; G10L 15/26; G10L 15/28
USPC .............................. 707/740, 999.102; 704/236
See application file for complete search history.

(56) References Cited

U.S. PATENT DOCUMENTS

| | | | |
|---|---|---|---|
| 5,500,920 A * | 3/1996 | Kupiec | 704/270.1 |
| 5,675,706 A | 10/1997 | Lee et al. | |
| 5,794,249 A | 8/1998 | Orsolini et al. | |
| 6,076,054 A | 6/2000 | Vysotsky et al. | |
| 6,185,527 B1 | 2/2001 | Petkovic et al. | |
| 6,243,676 B1 | 6/2001 | Witteman | |
| 6,314,400 B1 | 11/2001 | Klakow | |
| 6,345,252 B1 | 2/2002 | Beigi et al. | |
| 6,345,253 B1 | 2/2002 | Viswanathan | |
| 6,393,398 B1 | 5/2002 | Imai et al. | |
| 6,442,518 B1 * | 8/2002 | Van Thong et al. | 704/235 |
| 6,505,153 B1 | 1/2003 | Van Throng et al. | |
| 6,507,816 B2 * | 1/2003 | Ortega | 704/235 |
| 6,636,238 B1 * | 10/2003 | Amir et al. | 715/730 |

(Continued)

OTHER PUBLICATIONS

Jones et al, "Retrieving Spoken Documents by Combining Multiple Index Sources", 1996, pp. 30-38.*

(Continued)

*Primary Examiner* — Brannon W Smith
(74) *Attorney, Agent, or Firm* — Wolf, Greenfield & Sacks, P.C.

(57) ABSTRACT

A method and system are provided of spoken document retrieval using multiple search transcription indices. The method includes receiving a query input formed of one or more query terms and determining a type of a query term, wherein a type includes a term in a speech recognition vocabulary or a term not in a speech recognition vocabulary. One or more indices of search transcriptions are selected for searching the query term based on the type of the query term. The one or more indices are generated using different speech transcription methods. The results for the query term are scored by the one or more indices and the results of the one or more indices for the query term are merged. The results of the one or more query terms are then merged to provide the results for the query.

16 Claims, 9 Drawing Sheets

(56) References Cited

U.S. PATENT DOCUMENTS

| | | | |
|---|---|---|---|
| 6,873,993 B2* | 3/2005 | Charlesworth et al. | 707/740 |
| 6,990,448 B2 | 1/2006 | Charlesworth et al. | |
| 7,054,812 B2 | 5/2006 | Charlesworth et al. | |
| 7,177,795 B1 | 2/2007 | Chen et al. | |
| 7,181,398 B2 | 2/2007 | Thong et al. | |
| 7,240,003 B2 | 7/2007 | Charlesworth et al. | |
| 7,310,600 B1 | 12/2007 | Garner et al. | |
| 7,315,818 B2 | 1/2008 | Stevens et al. | |
| 7,603,273 B2 | 10/2009 | Poirier | |
| 7,912,699 B1 | 3/2011 | Saraclar et al. | |
| 8,005,676 B2 | 8/2011 | Duke et al. | |
| 8,670,977 B2* | 3/2014 | Saraclar et al. | 704/9 |
| 2002/0022960 A1 | 2/2002 | Charlesworth et al. | |
| 2002/0026309 A1 | 2/2002 | Rajan | |
| 2002/0052740 A1 | 5/2002 | Charlesworth et al. | |
| 2002/0138265 A1 | 9/2002 | Stevens et al. | |
| 2002/0188453 A1 | 12/2002 | Hirschberg et al. | |
| 2003/0023437 A1* | 1/2003 | Fung | 704/236 |
| 2003/0065655 A1* | 4/2003 | Syeda-Mahmood | 707/3 |
| 2003/0177108 A1 | 9/2003 | Charlesworth et al. | |
| 2004/0210443 A1* | 10/2004 | Kuhn et al. | 704/276 |
| 2005/0192944 A1* | 9/2005 | Flinchem | 707/3 |
| 2005/0203751 A1 | 9/2005 | Stevens et al. | |
| 2006/0015339 A1 | 1/2006 | Charlesworth et al. | |
| 2006/0259302 A1* | 11/2006 | Lewis et al. | 704/255 |
| 2007/0133518 A1 | 6/2007 | Ben-David et al. | |
| 2008/0082336 A1 | 4/2008 | Duke et al. | |
| 2009/0030680 A1 | 1/2009 | Mamou | |
| 2009/0150152 A1 | 6/2009 | Wasserblat et al. | |

OTHER PUBLICATIONS

Bazzi et al, "Modeling Out-of-Vocabulary Words for Robust Speech Recognition", 2000.*

Agrawal et al, "Automated Ranking of Database Query Results", 2003.*

Nishizaki et al, "Robust Spoken Document Retrieval Methods for Misrecognition and Out-of-Vocabulary Keywords",2004, Systems and Computers in Japan, vol. 45, No. 14.*

Mangu et al, "Finding consensus in speech recognition: word error minimization and other applications of confusion networks", 2000.*

Logan et al, "Word and Sub-Word Indexing Approaches for Reducing the Effects of OOV Queries on Spoken Audio", 2002.*

Smith et al, "Statistical Techniques for Video Analysis and Searching", 2003.*

Amir et al., Advances in Phonetic Word Spotting. IBM Research Report. Aug. 29, 2001;RJ10215 (95089). 14 pages.

Amir et al., Mutual Relevance Feedback for Multimodal Query Formulation in Video Retrieval. Proc 7th ACM SIGMM Int Workshp Multimed Info Retr. 2005;17-24.

Amir et al., Search the Audio, Browse the Video—A Generic Paradigm for Video Collections. EURASIP J Appl Sig Proc. 2003;2:209-22.

Clements et al., Phonetic Searching Applied to On-Line Distance Learning Modules. Digital Signal Processing Workshop 2002 and the 2nd Signal Processing Education Workshop. Proc 2002 IEEE. Oct. 13-16, 2002;10:186-91. 6 pages.

Clements et al., Phonetic Searching vs. LVCSR: How to Find What You Really Want in Audio Archives. Int J Speech Tech. Jan. 2002;5(1):9-22. 17 pages.

Hori et al., Open-Vocabulary Spoken Utterance Retrieval Using Confusion Networks. IEEE. 2007; IV 73-6. people.csail.mit.edu/hazen/publications/icassp07_hori.pdf.

Logan et al., Approaches to Reduce the Effects of OOV Queries on Indexed Spoken Audio. HP Labs Cambridge. Mar. 5, 2003;HPL-2003-46. 18 pages.

Witbrock et al., Using Words and Phonetic Strings for Efficient Information Retrieval from Imperfectly Transcribed Spoken Documents. International Conference on Digital Libraries. Proc 2nd ACM Int Conf Dig Libr. 1997:30-5.

Yazgan et al., Hybrid Language Models for Out of Vocabulary Word Detection in Large Vocabulary Conversational Speech Recognition. 2004 IEEE Int Conf Acoust Speech Sig Proc. 2004;I745-8.

Dharanipragada, et al., "A Multistage Algorithm for Spotting New Words in Speech," *IEEE Transactions on Speech and Audio Processing*, vol. 10, No. 8, Nov. 2002, pp. 542-550.

Philip Woodland, Sue Johnson, Pierre Jourlin and Karen Sparck Jones. 2000. Effects of Out of Vocabulary Words in Spoken Document Retrieval (poster session). SIGIR '00: Proceedings of the 23rd annual international ACM SIGIR conference on Research and development in information retrieval, 372-374. Athens, Greece. ACM Press.

Jonathan Mamou, Bhuvana Ramabhadran, Olivier Siohan. 2007. Vocabulary Independent Spoken Term Detection. SIGIR '07: Proceedings of the 30th annual international ACM SIGIR conference on Research and development in information retrieval.

Beth Logan, Pedro Moreno, Jean-Manuel Van Thong and Ed Whittaker. 1996. An Experimental Study of an Audio Indexing System for the Web. Proceedings of ICSLP.

John S. Garofolo, Cedric G. P. Auzanne and Ellen M. Voorhees. 2000. The TREC Spoken Document Retrieval Track: A Success Story. Proceedings of the Ninth Text Retrieval Conference (TREC-9). National Institute of Standards and Technology (NIST).

Brett Matthews, Upendra Chaudhari and Bhuvana Ramabhadran. 2007. Fast Audio Search using Vector Space Modeling. ASRU, 641-646.

Murat Saraclar and Richard Sproat. 2004. Lattice-Based Search for Spoken Utterance Retrieval. "HLTNAACL: Main Proceedings", 129-136.

Ron Fagin, Amnon Lotem and Moni Naor. 2003. Optimal Aggregation Algorithms for Middleware. J. Computer and System Sciences 66, 614-656.

U.S. Appl. No. 11/781,285, filed Jul. 23, 2007, Mamou et al.

* cited by examiner

SPOKEN DOCUMENT RETRIEVAL USING MULTIPLE SPEECH TRANSCRIPTION INDICES

CROSS-REFERENCE TO RELATED APPLICATIONS

The present application is a continuation-in-part of U.S. patent application Ser. No. 11/781,285 filed Jul. 23, 2007, titled "Method and System for Indexing Speech Data".

FIELD OF THE INVENTION

This invention relates to the field of spoken document retrieval using a search query. In particular, the invention relates to using multiple speech transcription indices in spoken document retrieval.

BACKGROUND OF THE INVENTION

The rapidly increasing amount of spoken data calls for solutions to index and search this data. The classical approach consists of converting the speech to word transcripts using large vocabulary continuous speech recognition (LVCSR) tools. In the past decade, most of the research efforts on spoken data retrieval have focused on extending classical information retrieval (IR) techniques to word transcripts.

However, a significant drawback of such approaches is that search on queries containing out-of-vocabulary (OOV) terms will not return any results. OOV terms are words missing in the automatic speech recognition (ASR) system vocabulary. Those words are replaced in the output transcript by alternatives that are probable, given the recognition acoustic model and the language model. It has been experimentally observed that over 10% of user queries can contain OOV terms, as queries often relate to named entities that typically have a poor coverage in the ASR vocabulary.

In many applications, the OOV rate may get worse over time unless the recognizer's vocabulary is periodically updated.

An approach for solving the OOV issue consists of converting the speech to phonetic transcripts and representing the query as a sequence of phones. Such transcripts can be generated by expanding the word transcripts into phones using the pronunciation dictionary of the ASR system. This kind of transcript is acceptable to search OOV terms that are phonetically close to in-vocabulary (IV) terms.

Another way would be to use sub-word (phones, syllables, or word-fragments) based language model. The retrieval is based on searching the sequence of sub-words representing the query in the sub-word transcripts. The main drawback of this approach is the inherent high error rate of the transcripts and such sub-word approaches cannot be an alternative to word transcripts for searching IV query terms that are part of the vocabulary of the ASR system.

Many techniques can be used to generate transcripts. Above are described sub-word-based and word-based approaches that have been used for IR on speech data; the former suffers from low accuracy and the latter from limited vocabulary of the recognition system.

SUMMARY OF THE INVENTION

According to a first aspect of the present invention there is provided a method of spoken document retrieval using multiple search transcription indices, the method comprising: receiving a query input formed of one or more query terms; for each query term determining a type of the query term, wherein a type includes a term in a speech recognition vocabulary or a term not in a speech recognition vocabulary; selecting one or more indices of search transcriptions for searching the query term based on the type of the query term; scoring the results from the one or more indices; and merging the results of the one or more indices for the query term.

According to a second aspect of the present invention there is provided a computer software product for spoken document retrieval using multiple search transcription indices, the product comprising a computer-readable storage medium, storing a computer in which program comprising computer-executable instructions are stored, which instructions, when read executed by a computer, perform the following steps: receiving a query input formed of one or more query terms; for each query term determining a type of the query term, wherein a type includes a term in a speech recognition vocabulary or a term not in a speech recognition vocabulary; selecting one or more indices of search transcriptions for searching the query term based on the type of the query term; scoring the results from the one or more indices; and merging the results of the one or more indices for the query term.

According to a third aspect of the present invention there is provided a method of providing a service to a customer over a network for spoken document retrieval, the service comprising: receiving a query input formed of one or more query terms; for each query term determining a type of the query term, wherein a type includes a term in a speech recognition vocabulary or a term not in a speech recognition vocabulary; selecting one or more indices of search transcriptions for searching the query term based on the type of the query term; scoring the results from the one or more indices; and merging the results of the one or more indices for the query term.

According to a fourth aspect of the present invention there is provided a search system for spoken document retrieval using multiple search transcription indices, the method comprising: a processor; a query input means, wherein a query is formed of one or more query terms; means for determining a type of a query term by reference to a speech recognition vocabulary, wherein a type includes a term in a speech recognition vocabulary or a term not in a speech recognition vocabulary; means for selecting one or more indices of search transcriptions for searching the query term based on the type of the query term; means for scoring the results from the one or more indices; and means for merging the results of the one or more indices for the query term.

A general retrieval model is provided for vocabulary-independent search that combines retrieval on different speech transcripts generated according to different methods. This is different from meta-search that sends the whole query to multiple search engines and then combines the results. In this disclosure, for each query term it is decided to which search engines to send it according to the type of the term. Then, the results for each term are combined and, finally, the results of all terms are combined.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

A retrieval model for vocabulary-independent search is provided. Speech transcripts are generated according to different methods and retrieval on each transcript is carried out according to different methods.

Figure 1:
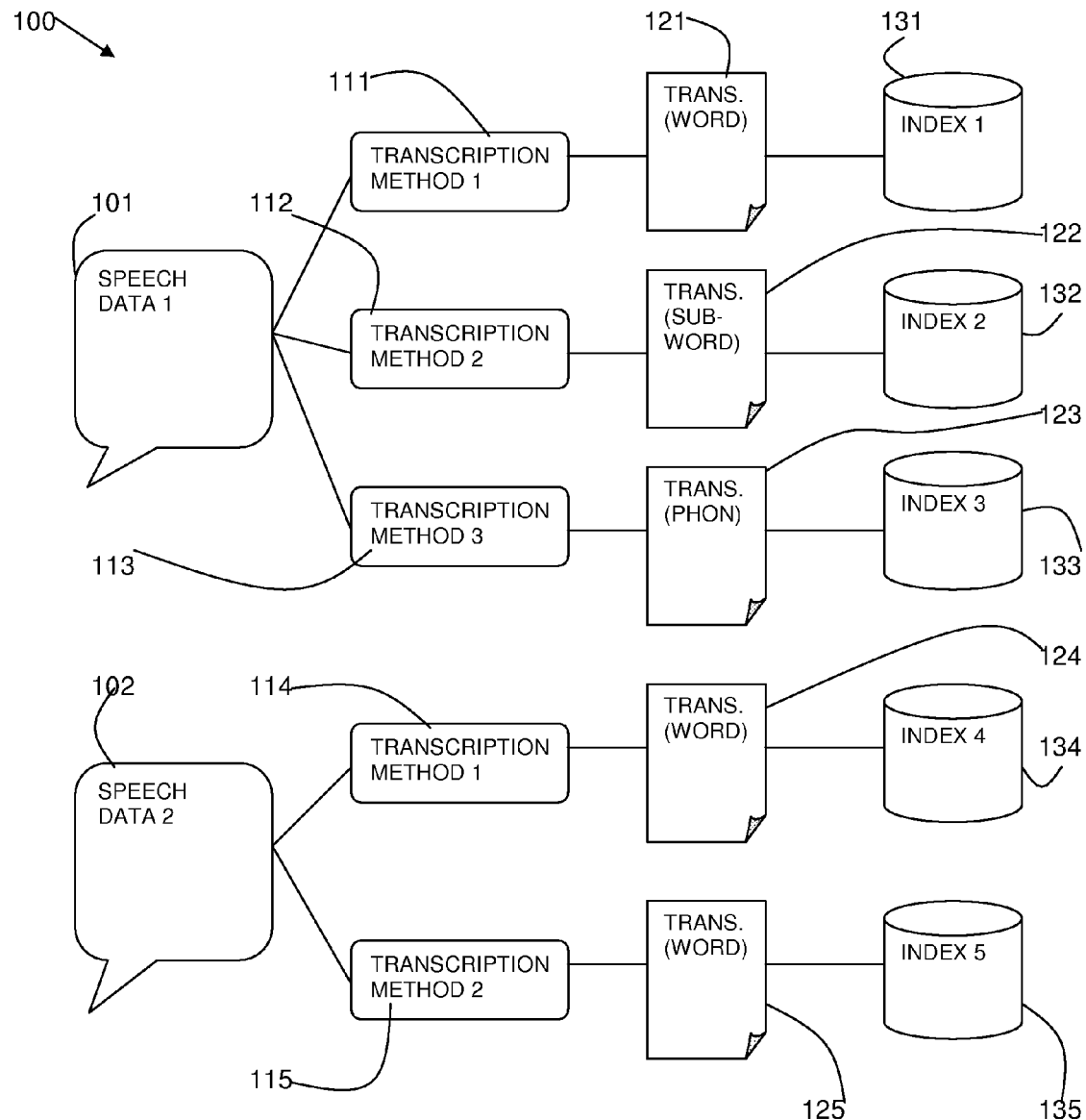
FIG. 1 is a schematic diagram showing indexing of speech data.

Referring to FIG. 1, a schematic diagram is shown of indexing of speech data 100. A first speech file 101 is transcribed into multiple transcripts 121-123 according to different methods 111-113. Each transcript 121-123 is indexed in a separate index 131-133. In this way, there are several indices 131-133 of the same first speech file 101. A speech file 101 may be speech data recorded in any form and stored for retrieval.

FIG. 1 shows a second speech file 102 which in turn is transcribed into multiple transcripts 124-125 according to different methods 114-115. In this way, there are several indices 134-135 of the second speech file 102. It should be noted that a method 114-115 of transcribing the second speech file 102 may be the same as one of the methods of transcribing 111-113 the first file 101.

The transcripts 121-125 may be generated according to different methods 111-115, for example, word decoding, sub-word decoding, phonetic representation of word decoding, etc.

A query may be submitted in the following different forms or as a combination of forms, including:
 a written query in which a user inputs the text of the query;
 a spoken query in which a user speaks the text of the query and a speech recognition system transcribes the query; and/or
 an image query in which the user supplies an image containing text of the query and an optical character recognition (OCR) system is used to find the written text of the query.

A query may take the form of a single query term in the form of a keyword or a query phrase formed of a plurality of words to be searched as a single entity. A query may alternatively be formed of multiple query terms to be search independently. The query terms have Boolean or phrase constraints between them (for example, Term1 AND Term2 OR Term3).

A search is made for speech files which are relevant to a query. A query submitted to a search system may include query terms which are in vocabulary (IV) or out of vocabulary (OOV). The vocabulary of the automatic speech recognition (ASR) system used to generate the word transcripts is given and, therefore, IV and OOV terms can be identified in a query.

In the described method and system, a query is divided into query terms which can each be identified as IV or OOV terms. In the described method and system, a query term formed of a phrase is split into individual query terms which are either IV or OOV and recombined as a phrase during a merging process described further below.

In the described method and system, for each query term, it is decided to which search engines or indices to send the query term for speech file retrieval based on the type of the query term (IV or OOV) and the final result list is based on the combination of the results returned by all the different search engines or indices.

Figure 2:
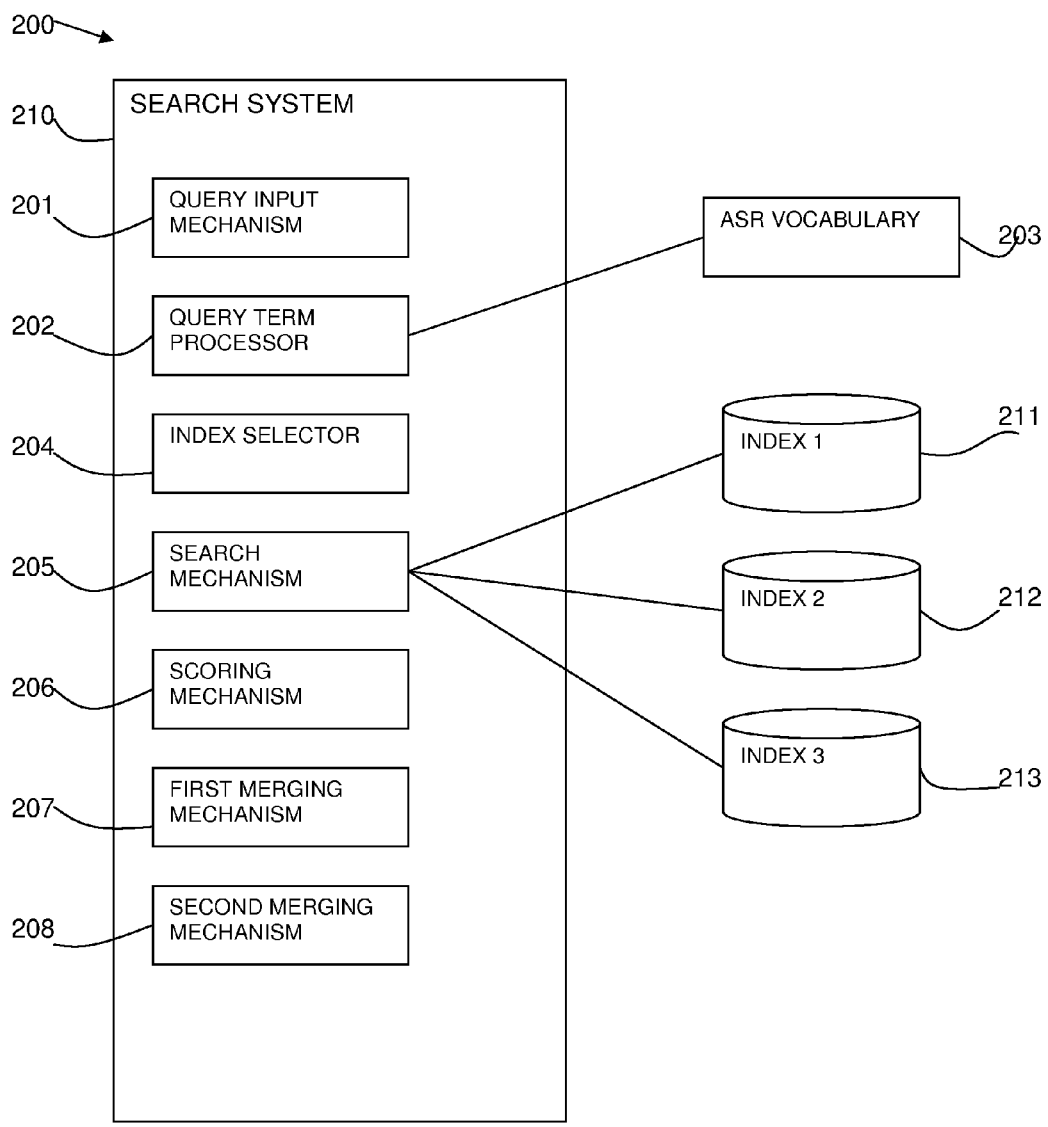
FIG. 2 is a block diagram of a system in accordance with the present invention.

Referring to FIG. 2, a block diagram is shown of a system for speech file retrieval 200. The system 200 includes a search system 210 including an input mechanism 201 for a query. A query term processor 202 is provided for dividing the query into query terms and determining the type of the query terms. Determining the type of the query terms may include referencing an ASR vocabulary 203 to determine if a query term is an IV term or an OOV term. The ASR vocabulary 203 may be provided as part of the search system 210 or may be referenced from a remote location.

The search system 210 includes an index selector 204 for selecting indices 211-213 for searching for a query term. A search mechanism 205 sends the query terms to the selected indices 211-213. A scoring mechanism 206 is provided either associated with the indices 211-213 or provided in the search system 210 for scoring the results of speech files located in the indices 211-213 for a query term.

The search system 210 also includes a first merging mechanism 207 for merging the results of a query term provided from different indices 211-213. A second merging mechanism 208 is provided for merging the results of all the query terms including handling query terms which form a phrase in the query, with a results output 209 for the final query results.

Figure 3:
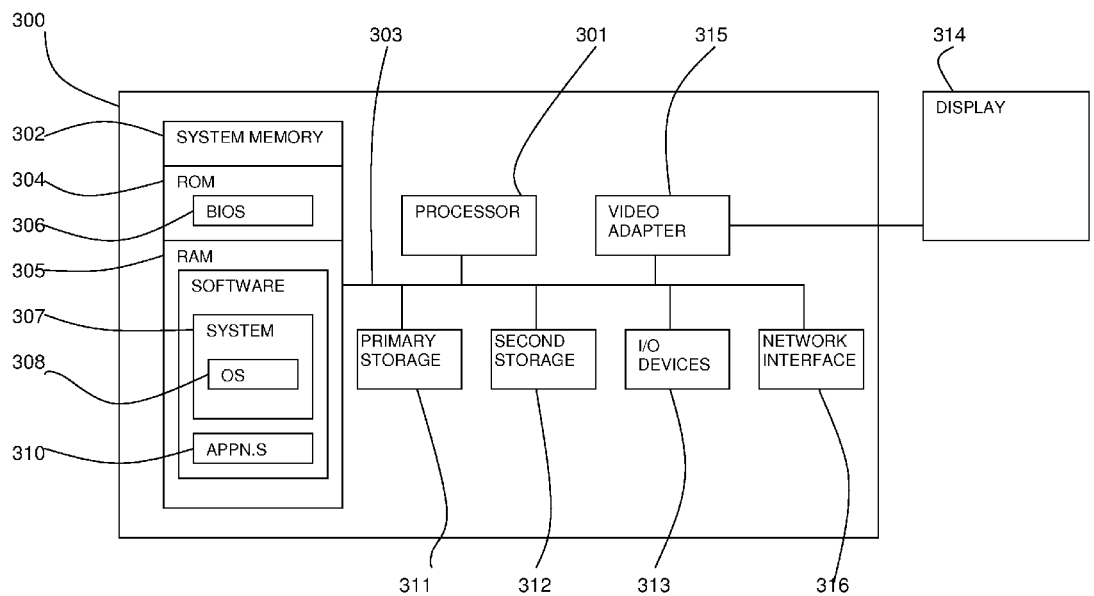
FIG. 3 is a block diagram of a computer system in which the present invention may be implemented.

Referring to FIG. 3, an exemplary system for implementing a search system includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

The method is now described in more detail. A query is composed of IV and OOV terms. Let the query be denoted as $Q=(iv_1, \ldots, iv_n, oov_1, \ldots, oov_m)$ where each $iv_1$ is an IV term and each $oov_1$ is an OOV term. In a general setup, there may be several indices of transcripts, where each transcript has been produced according to different methods. It needs to be decided for each term in which of its forms to query it (i.e., word or sub-word) and to which indices to send it.

A simple setup is first described in which there is one index based on word transcripts for IV terms and one index based on sub-word transcripts for OOV terms. A general case is then described.

In the simple case, the query is decomposed into query terms such that each $iv_1$ is sent as a sub-query to a word index, and each $oov_1$ is converted to its sub-word representation and is sent as a sub-query to a sub-word index. Each index runs its sub-query using a form of scoring and returns a list of speech files sorted by decreasing order of relevance to the given sub-query. The scores may be for example in the range [0, 1] with 1 being the most relevant result.

It is assumed that each transcript referenced by an index relates a unique speech file, and the next step is to merge the lists of results from the indices into a single list of files that are most relevant to the sub-query using some aggregation function to combine the scores from the different lists.

This aggregation is known as the top-k problem-return the best k documents (in this case speech files) that match the query. It should be noted that for large collections with a low correlation between the lists of results, the merging can be a time consuming process since it may require scanning a large number of documents from each list until such a set of k documents is found.

To make this process efficient, the Threshold Algorithm described in "Optimal aggregation algorithms for middleware" by Ronal Fagin, et al published in the Journal of Computer and System Sciences 66(2003) 614-656, also known as the TA algorithm is used. The TA algorithm consists of scanning simultaneously the different lists row by row. For each scanned document in the current row, it finds its score in the other lists and then it uses the aggregate function to find its total score. Then, it calculates the total score of the current row using the same aggregate function. The algorithm stops when there are k documents with a total score larger than the last row total score.

The general setup is now described in which there may be several word indices and several sub-word indices. Moreover, each $iv_1$ term can be sent to one or more word indices and to one or more sub-word indices using its sub-word representation; each $oov_1$ term can be sent to one or more sub-word indices using its N-best sub-word representation.

For example, if a sub-word transcript is "A B C D E F" where A, B, . . . , F are sub-words. With N=3, its N-best sub-word representation will be "ABC BCD CDE DEF".

In this general case, the TA is run as follows. For each query term, it is decided to which indices to send it and then it is sent as a sub-query to each of the selected indices. A list of results is returned from each index sorted by decreasing score order. A TA is applied on those lists and a single list of documents is obtained that contains the query term in at least one of the indices. This step is referred to as local TA.

After a local TA is carried out for all query terms, a global TA is applied to all the lists to get the final set of top-k documents that best match the query.

The TA can be run with query semantics, such as OR or AND semantics. In OR semantics, a document is returned even if it is not relevant according to some lists. In AND semantics, a document that is not relevant in one list is rendered not relevant regardless of its final aggregated score. In one embodiment, the local TA may be run in OR semantics: it is sufficient that the query term appears in the document according to any chosen index to consider the document as relevant to this query term. The global TA may be run in the semantics defined in the query.

Figure 4:
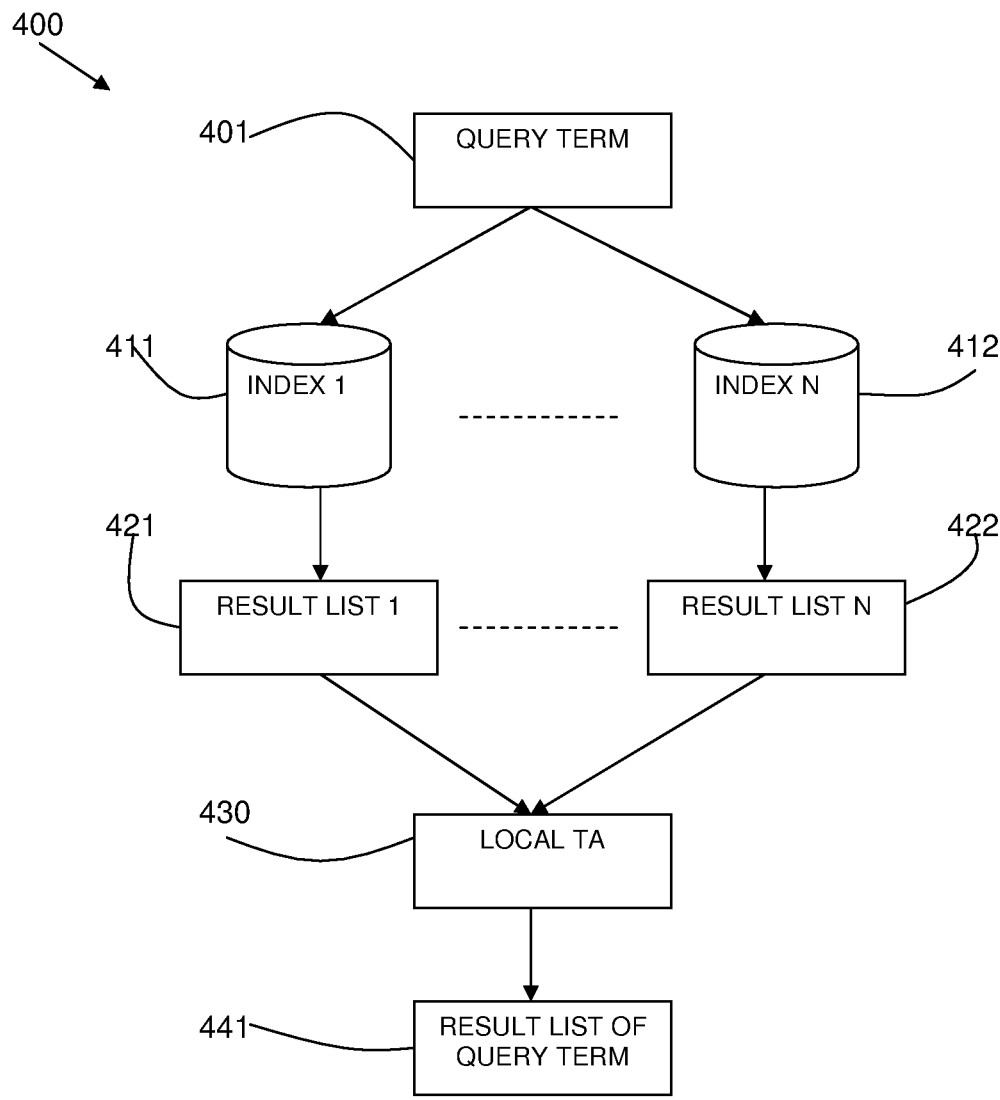
FIG. 4 is a flow diagram of a method in accordance with an aspect of the present invention.

Referring to FIG. 4, a schematic flow diagram 400 shows the processing of a sub-query for a query term. A query term 401 is selected and sent to multiple indices 411-412. Each index 411-412 returns a results list 421-422 with sorted results. A local TA 430 is applied to the results lists 411-412 to obtain a combined result list 441 for the query term.

Figure 5:
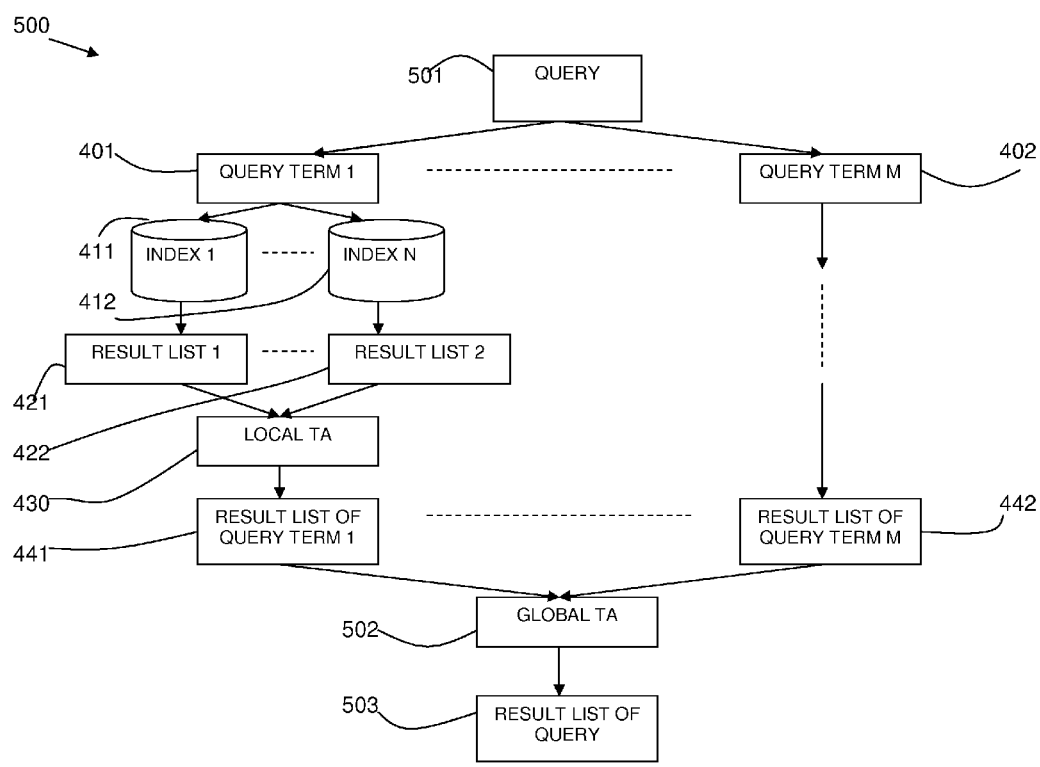
FIG. 5 is a flow diagram of an overall method in accordance with the present invention.

Referring to FIG. 5, a schematic flow diagram 500 shows the processing of a query. A query 501 is input and divided into query terms 401-402. For each query term 401-402 the flow of FIG. 4 is carried out sending the query term 401, 402 to multiple indices 411-412. The results lists 421-422 of the indices 411-412 are combined by applying the local TA 430 and returning a combined results list 441, 442.

A global TA 502 is applied to aggregate the results lists 441, 442 of the sub-queries to return a final list of results 503 for the query 501. The global TA 502 is also responsible for combining query terms which formed a phrase in the query 501.

A worked example is provided. The query is George AND bondesque. There are two query terms: George and bondesque and "George" is IV, "bondesque" is OOV.

Suppose there are multiple indices:

Index 1 based on word decoding;

Index 2 based on phonetic decoding;

Index 3 based on phonetic representation of the 1-best path of the word decoding.

The search of George on the different indices, returns the following result lists, each pair is (document ID, score):

Index 1: (10, 0.8) (12, 0.6) (9, 0.2)

Index 2: (10, 0.7) (13, 0.3)

Index 3: (10, 0.6) (9, 0.4)

The local TA (aggregate sum with OR semantics) will return the result list: (10, 0.7) (12, 0.2) (9, 0.2) (13, 0.1).

The search of George on the different indices, returns the following result lists, each pair is (document id, score):

Index 2: (10, 0.6)

Index 3: (10, 0.2) (9, 0.2)

The local TA (aggregate sum with OR semantics) will return: (10, 0.4) (9, 0.1).

Finally, the global TA (aggregate sum with AND semantics) will return the result list: (10, 0.55) (9, 0.15)

Figure 6:
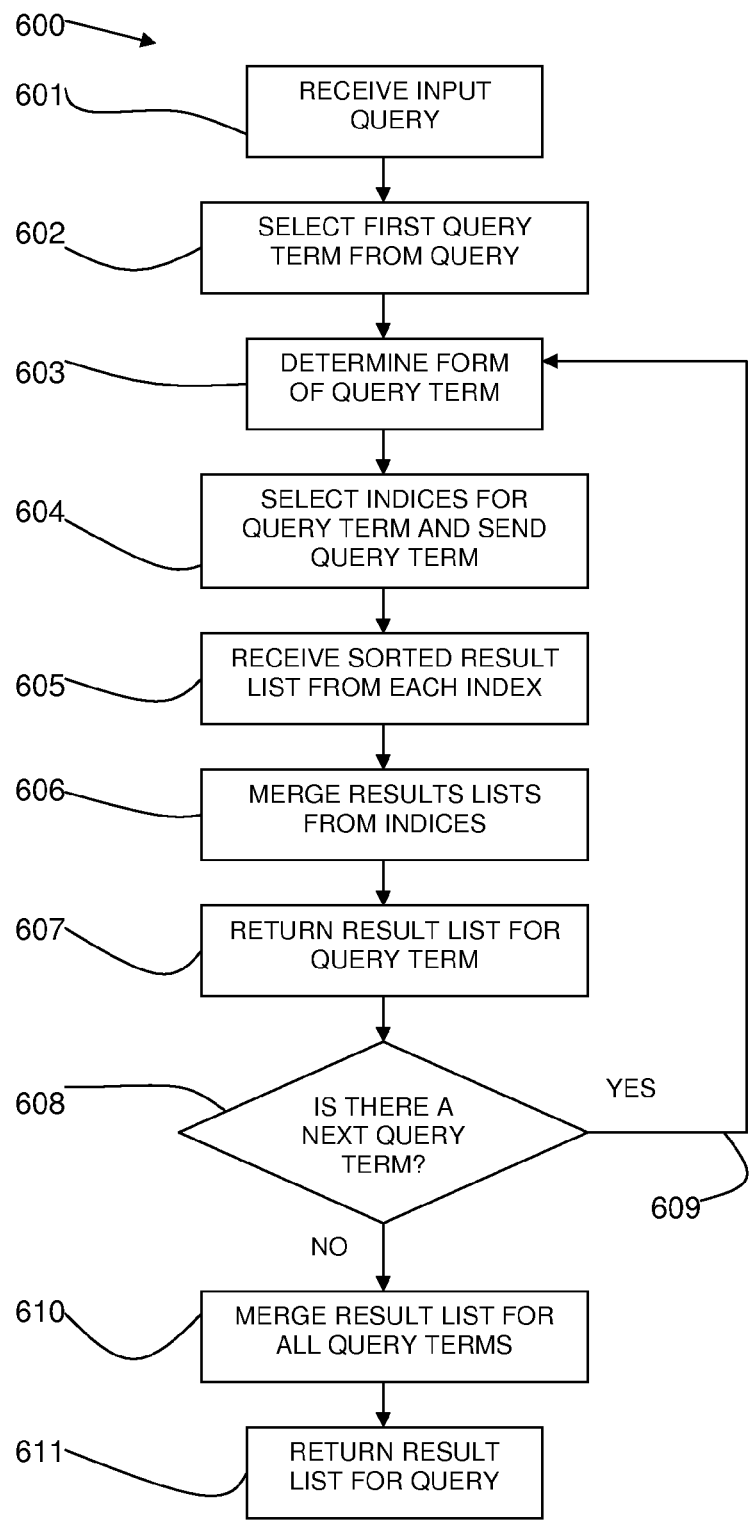
FIG. 6 is a further flow diagram of the overall method in accordance with the present invention.

Referring to FIG. 6, a flow diagram 600 of the described method is shown. An input query is received 601. A first query term is selected 602 from the query. The type of the query term is determined 603, for example, if the query term is IV or OOV. Indices are selected for the query term and the query term is sent 604 to appropriate indices depending on its form. For example, an IV query term may be sent to both word and sub-word indices while an OOV query term may be sent to sub-word indices only. Both forms of query term may be sent to a combined word and sub-word index as described further below. A query term which is a phrase is divided into individual query terms formed of either IV or OOV terms.

A sorted list of results is returned 605 from each index. The lists of results are merged 606 to return 607 a single results list for the query term.

It is determined 608 if there is a next query term. If so, the method loops 609 to process the next query term. If there are no more query terms, the results lists for the various query terms are merged 610. This merging may use the query semantics used in the original query including any phrase semantics. A final result list for the query is returned 611.

Further specific embodiment details are now provided of indexing and retrieval.

An ASR system is used for transcribing speech data. It works in speaker-independent mode. For best recognition results, an acoustic model and a language model are trained in advance on data with similar characteristics. The ASR system generates word lattices. A compact representation of a word lattice called a word confusion network (WCN) is used. Each edge (u, v) is labeled with a word hypothesis and its posterior probability, i.e., the probability of the word given the signal. One of the main advantages of WCN is that it also provides an alignment for all of the words in the lattice. Although WCNs are more compact than word lattices, in general the 1-best path obtained from WCN has a better word accuracy than the 1-best path obtained from the corresponding word lattice.

Word decoding can be converted to its phonetic representation using the pronunciation dictionary of the ASR system.

Phonetic output is generated using a word-fragment decoder, where word-fragments are defined as variable-length sequences of phones. The decoder generates 1-best word-fragments that are then converted into the corresponding phonetic strings.

Example indices may include a word index on the word confusion network (WCN); a word phone index which phonetic N-gram index of the phonetic representation of the 1-best word decoding; and a phone index a phonetic N-gram index of the 1-best fragment decoding.

An example of an indexing model is provided. For phonetic transcripts, N-grams of phones are extracted from the transcripts and indexed. The document is extended at its beginning and its end with wildcard phones such that each phone appears exactly in N N-grams. Space characters are ignored. In order to compress the phonetic index, each phone is represented by a single character.

Both word and phonetic transcripts are indexed in an inverted index. Each occurrence of a unit of indexing (word or N-gram of phones) u in a transcript D is indexed with its position. In addition, for WCN indexing, the confidence level of the occurrence of u at the time t that is evaluated by its posterior probability $Pr(u|t,D)$ is stored.

Search methods for phonetic retrieval include: exact; expansion—exact search with query expansion; fuzzy—fuzzy search; fuzzy, expansion—fuzzy search with query expansion.

A word search is used for retrieving from indices based on word transcripts and phonetic search for retrieving from indices based on phonetic transcripts. In one embodiment, a combination of the Boolean Model and the Vector Space Model with modifications of the term frequency and document frequency is used to determine the relevance of a document to a query. Afterward, an aggregate score is assigned to the result based on the scores of the query terms from the search on the different.

Weighted sum is used as aggregate function for both local and global TA. It is given in the following formula:

$$\frac{\sum_i w_i \cdot \text{score}(Q, D_i)}{\sum_i w_i}$$

where $\text{score}(Q,D_i)$ is the score of a document D in list i for query Q and $w_i$ is the weight assigned to this list. For example, weights in the local TA are respectively 5, 3, 2 for the word, word phone and phone indices. In the global TA, the weights of IV and OOV terms are respectively equal to 2 and 1.

Example scoring methods used in the indices are now described. In a word search, a scoring method of weighted term frequency may be used. This approach can be used only for IV terms. The posting lists are extracted from the word inverted index. The classical TFIDF method is extended using the confidence level provided by the WCN.

Let the sequence of all the occurrences of an IV term u in the document D be denoted by $occ(u,D)=(t_1, t_2, \ldots, t_n)$. The term frequency of u in D, $tf(u,D)$, is given by the following formula:

$$tf(u, D) = \sum_{i=1}^{|occ(u,D)|} Pr(u|t_i, D)$$

The computation of the document frequency is not modified.

In the following, an approach for fuzzy phonetic search is presented.

Although, this approach is more appropriate for OOV query terms, it can be also used for IV query terms. However, the retrieval will probably be less accurate, since the space character is ignored during indexing process of the phonetic transcripts.

If the query term is OOV, it is converted to its N-best phonetic pronunciation using the joint maximum entropy N-gram model. For ease of representation, first a fuzzy phonetic search is described using only the 1-best presentation and in the next section, it is extended to N-best. If the query term is IV, it is converted to its phonetic representation.

The search is decomposed into two steps: query processing and then, pruning and scoring.

In query processing, each pronunciation is represented as a phrase of N-grams of phones. As for indexing, the query is extended at its beginning and its end with wildcard phones such that each phone appears in N N-grams. For example, the sequence of phones (A,B,C) with N=2 generates the phrase "?A AB BC C?" where ? is the wildcard phone.

During the query processing, several fuzzy matches for the phrase representation of the query are retrieved from the phonetic inverted index.

In order to control the level of fuzziness, the following two parameters are defined: $\delta_i$, the maximal number of inserted N-grams and $\delta_d$, the maximal number of deleted N-grams. Those parameters are used in conjunction with the inverted indices of the phonetic transcript to efficiently find a list of indexed phrases that are different from the query phrase by at most $\delta_i$ insertions and $\delta_d$ deletions of N-grams. Note that a substitution is also allowed by an insertion and a deletion. At the end of this stage, a list of fuzzy matches is obtained and for each match, the list of documents in which it appears.

The next step consists of pruning some of the matches using a cost function and then scoring each document according to its remaining matches. Consider a query term ph represented by the following sequence of phones $(p_1, p_2, \ldots, p_n)$ and ph' a sequence of phones $(p'_1, p'_2, \ldots, p'_m)$ that appears in the indexed corpus and that was matched to ph.

Define the confusion cost of ph with respect to ph', to be the smallest sum of insertions, deletions, and substitutions penalties required to change ph into ph'. A penalty $\alpha_i$ is assigned to each insertion and a penalty $\alpha_d$ to each deletion. For substitutions, a different penalty is given to substitutions that are more likely to happen than others. Seven groups of phones have been identified that are more likely to be confused with each other, denoted as metaphones groups. A penalty is assigned to each substitution depending on whether the substituted phones are in the same metaphone group $\alpha_{sm}$ or not $\alpha_s$. The penalty factors are determined such that $0 \le \alpha_{sm}, \le \alpha_i, \alpha_d, \alpha_s \le 1$. Note that it is different from the classical Levenshtein distance since it is non-symmetric and different penalties are assigned to each kind of error. The similarity of ph with ph' is derived from the confusion cost of ph with ph'.

A dynamic programming algorithm is used in order to compute the confusion cost; it extends the commonly used algorithm that computes the Levenshtein distance. The described implementation is fail-fast since the procedure is aborted if it is discovered that the minimal cost between the sequences is greater than a certain threshold, $\theta(n)$, given by the following formula:

$$\theta(n) = \theta \cdot n \cdot \max(\alpha_i, \alpha_d, \alpha_s)$$

where $\theta$ is a given parameter, $0 \le \theta < 1$. Note that the case of $\theta=0$ corresponds to exact match.

The cost matrix, C, is an $(n+1) \cdot (m+1)$ matrix. The element C(ij) gives the confusion cost between the subsequences $(p_1, p_2, \ldots, p_i)$ and $(p'_1, p'_2, \ldots, p'_j)$. C is filled using a dynamic programming algorithm. During the initialization of C, the first row and the first column are filled. It corresponds to the case that one of the subsequences is empty. $C(0, 0)=0, C(i, 0)=i \cdot \alpha_d$ and $C(0, j)=j \cdot \alpha_i$.

After the initialization step, each row i is traversed to compute the values of C(i, j) for each value of j. The following recursion is used to fill in row i:

$$C(i,j) = \min_{0 \le j \le m} [C(i-1,j) + \alpha_d, C(i,j-1) + \alpha_i, (i-1,j-1) + cc(p_i, p'_j)].$$

$cc(p_i, p'_j)$ represents the cost of the confusion of $p_i$ and $p'_j$, and it is computed in the following way:

if $p_i = p'_j$, $cc(p_i, p'_j) = 0$, if $p_i$ and $p'_j$ are in the same metaphone group, $cc(p_i, p'_j) = \alpha_{sm}$, if $p_i$ and $p'_j$ are not in the same metaphone group, $cc(p_i, p'_j) = \alpha_s$.

After the filling of row i, the computation is aborted if:

$$\min_{0 \le j \le m} \{C(i, j)\} > \theta(n).$$

The similarity of ph with respect to ph' is defined as, sim(ph, ph') as follows: if the computation is aborted the similarity sim(ph, ph') is 0; else $$sim(ph, ph') = 1 - \frac{C(n, m)}{n \cdot \max(\alpha_i, \alpha_d, \alpha_s)},$$

Note that $0 \le sim(ph, ph') \le 1$. Finally, the score is computed of ph in a document D, score(ph,D), using TFIDF. Define the term frequency of ph in D, tf(ph,D) by the following formula:

$$tf(ph, D) = \sum_{ph' \in D} sim(ph, ph')$$

and the document frequency of ph in the corpus, df(ph), $$df(ph) = |\{D | \exists ph' \in Ds \cdot t \cdot sim(ph, ph') > 0\}|$$

Example: consider a query term represented by the sequence of phones (A,B,C,D,E), and let N=2, $\delta_i = \delta_d = 2$ and $\max(\alpha_i, \alpha_d, \alpha_s) = 1$. Search for fuzzy matches of the phrase "?A AB BC CD DE E?" where ? is the wildcard phone. In the matched phrase "YA AB BX XC CD DE EY", there are two inserted bi-grams BX and XC, and one deleted bi-gram BC. This match corresponds to the sequence of phones ABXCDE and $$sim(ABCDE, ABXCDE) = 1 - \frac{\alpha_i}{5}.$$

The word and sub-word indices used by the described method and system may be combined as described in U.S. patent application Ser. No. 11,781,285 filed Jul. 23, 2007, titled "Method and System for Indexing Speech Data". In another embodiment, word and sub-word indices may also be combined based on offsets within a transcript instead of timestamps. The combining of the indices based on timestamps or offsets may be carried out by the TA.

Figure 7:
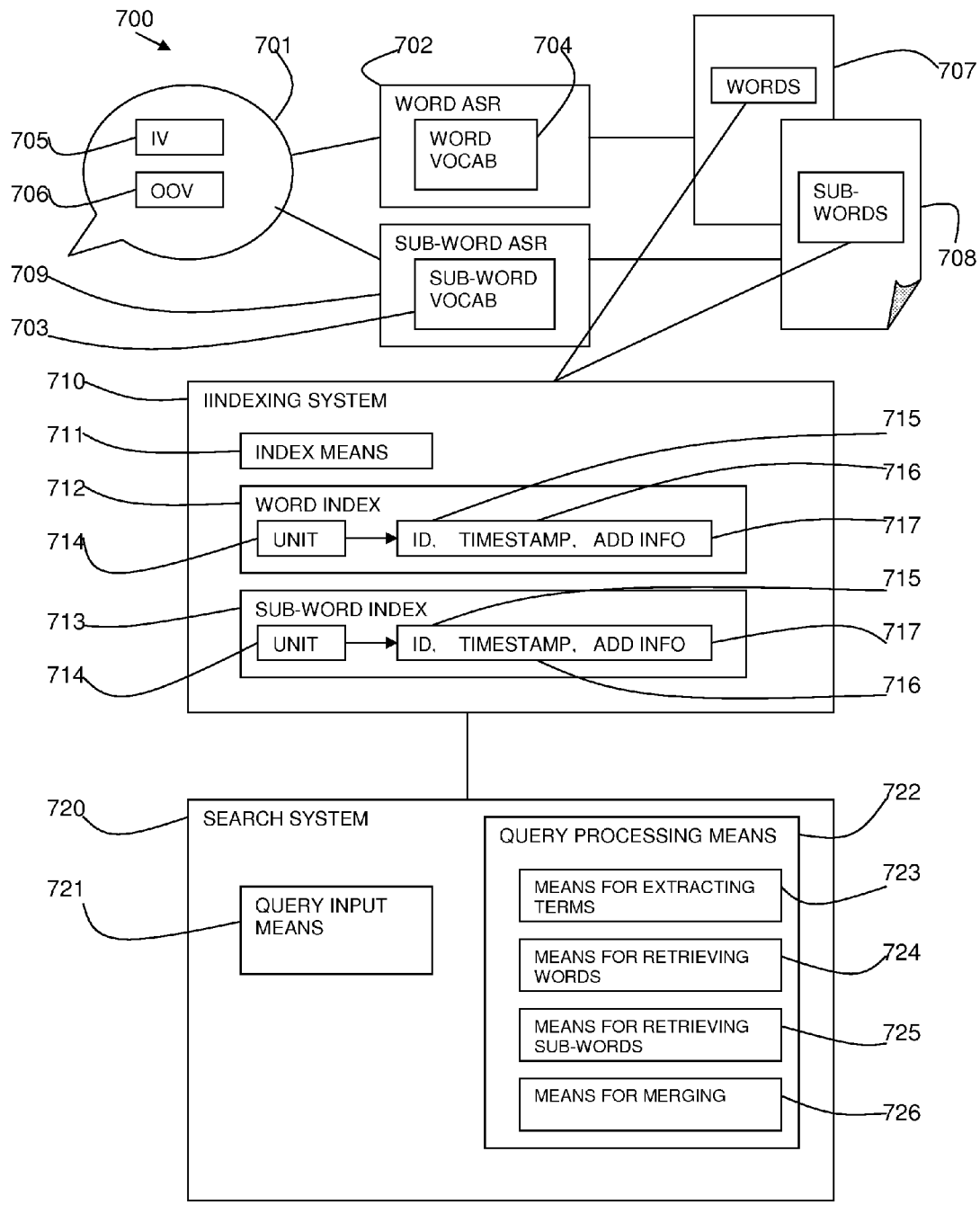
FIG. 7 is a block diagram of a system of providing a combined word and sub-word index as used in an aspect of the present invention.

FIG. 7 shows a system 700 for generating a word and sub-word indices which are combined using timestamps.

Speech data 701 is transcribed by an automatic speech recognition (ASR) system 702 to convert it into word transcripts 707. The ASR system 702 contains a word vocabulary 704 of IV terms 705 which it recognizes from the input speech 701. Terms which are in the speech data 701, but which are not in the word vocabulary 704 of the ASR system 702, are OOV terms 706.

The ASR system 702 working with the word vocabulary 704 can recognize only terms in the word vocabulary 704. The OOV terms 706 are output in the word transcripts 703 as terms from the word vocabulary 704 that are probable given the recognition acoustic model and the language model.

A sub-word ASR 709 is also provided which converts the speech data 701 to sub-word transcripts 708. The sub-words are typically phones, morphemes, syllables, or a sequence of phones. The sub-word ASR 709 works with language models to transcribe the speech data 701 into sub-words. In particular, it includes a sub-word vocabulary 703 to recognize sub-words in the speech data 701.

Both word and sub-word transcripts 707, 708 are built on all the speech data. The word transcript 707 contains a transcript of all the words in the speech data 701 using the IV terms in the word vocabulary 704. All OOV terms 706 in the speech data 701 will be transcribed incorrectly as IV terms since the OOV terms cannot be recognized using word transcription. The sub-word transcript 708 will contain the sub-word transcription of all the terms (IV and OOV) in the speech data 701 into sub-words from the sub-word vocabulary 703.

An indexing system 710 is provided that includes an indexing means 711 for processing terms in the word and sub-word transcripts 707, 708 to index the terms for search retrieval. The indexing system 710 may access the transcripts 707, 708 to be processed via a network. The indexing system 710 includes a first index 712 for word transcripts 707, and a second index 713 for sub-word transcripts 708.

In each of the indices 712, 713 the transcribed word or sub-word is stored as a unit 714 with a transcript or speaker identifier 715 and a timestamp 716 (for example, of the form of a start time and duration). The timestamp 716 of a unit 714 (word or sub-word) represents the time information in the speech data 701 about this unit 714. Generally, it is a start time of the unit 714 in the speech 701 and its duration.

Optionally, additional information 717 may also be included in the indices for a word 707 or sub-word 708. The additional information 717 may include, for example, posterior probability, rank relative to other hypotheses, etc. The posterior probability is the probability of the unit given the signal. In the case that the ASR hesitates between several alternatives (e.g. between "will come" and "welcome"), the rank is the relative position of the alternative among the other alternatives occurring at the same time.

The first and second indices 712, 713 may be combined in a single index containing words and sub-words with an indication as to whether a stored unit is a word or a sub-word, so that the different categories can be independently searched.

A search system 720 is provided for searching the first and second indices 712, 713 for a query term. In the described system, the search system 720 may be combined with the search system 210 of FIG. 2. A query term is input into the search system 720. The search system 720 may be used when a query term is recognized as a hybrid including both IV and OOV terms. The search system 720 may also be used for a query term which is an IV term using both the word index and the sub-word index. The search system 720 may further be used for OOV terms using only the sub-word index.

The search system 720 may access the indices 712, 713 remotely via a network. The search system 720 includes a query input means 721 in which a use can input a query. The query may take the form of a single keyword or multiple keywords to be searched as a phrase within the query.

The search system 720 includes a query term processing means 722 which includes: a means for extracting 723 individual words from the query term; a means for retrieving 724 a posting list from the word index 712; a means for retrieving 725 a posting list from the sub-word index 713; and a merging means 726. The merging means 726 merges the posting lists from the word and sub-word indices 712, 713 using the timestamps 716 stored in the indices 712, 713.

Figure 8:
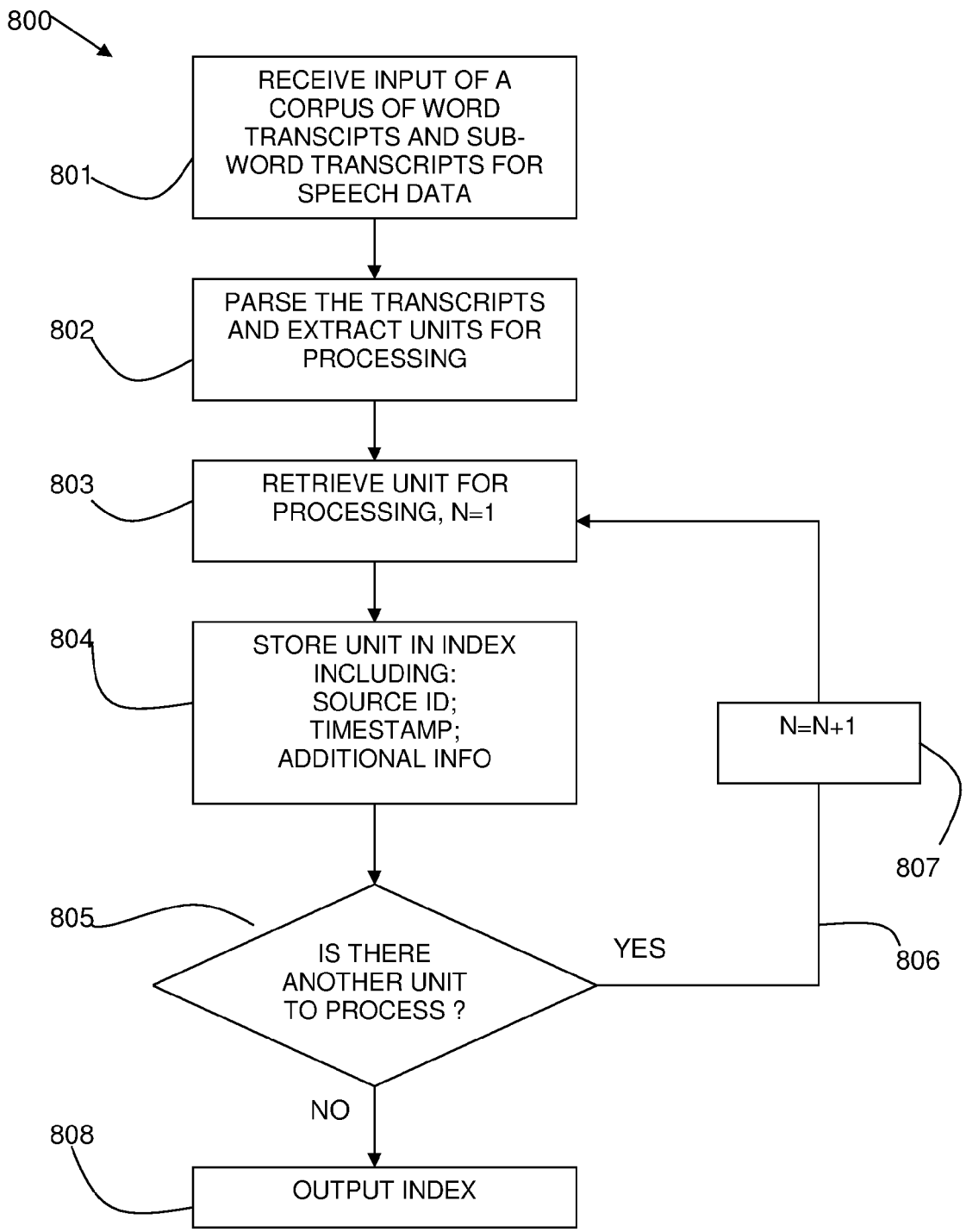
FIG. 8 is a flow diagram of a method of generating the combined word and sub-word index of FIG. 7.

An indexing algorithm is described with reference to FIG. 8. FIG. 8 shows a flow diagram 800 of a method of indexing in the combined word and sub-word index. An input 801 of a corpus of both word transcripts and sub-word transcripts of speech data is received. The corpus is processed, by parsing 802 the transcripts and extracting the units for processing.

A first unit (n=1) in the form of a word or sub-word for indexing is retrieved 803. The unit is stored 804 in the index including:
 a transcript or speaker identifier;
 a timestamp, for example, a start time and duration; and
 optionally, additional data provided by the transcript on the unit (e.g. the posterior probability, the name of the audio file, the word offset, etc.).

It is then determined 805 if there is a next unit for processing. If so, the method loops 806 and increments to unit n=n+1 807, and retrieves 803 and stores 804 the next unit. If there are no more units for processing, an index of the corpus of transcripts is output 808.

The indexing model is generic and is the same for all the different types of transcripts (e.g. one-best path, lattice, confusion network) providing a timestamp for each unit. The word and sub-word transcripts are indexed in two different indices.

Figure 9:
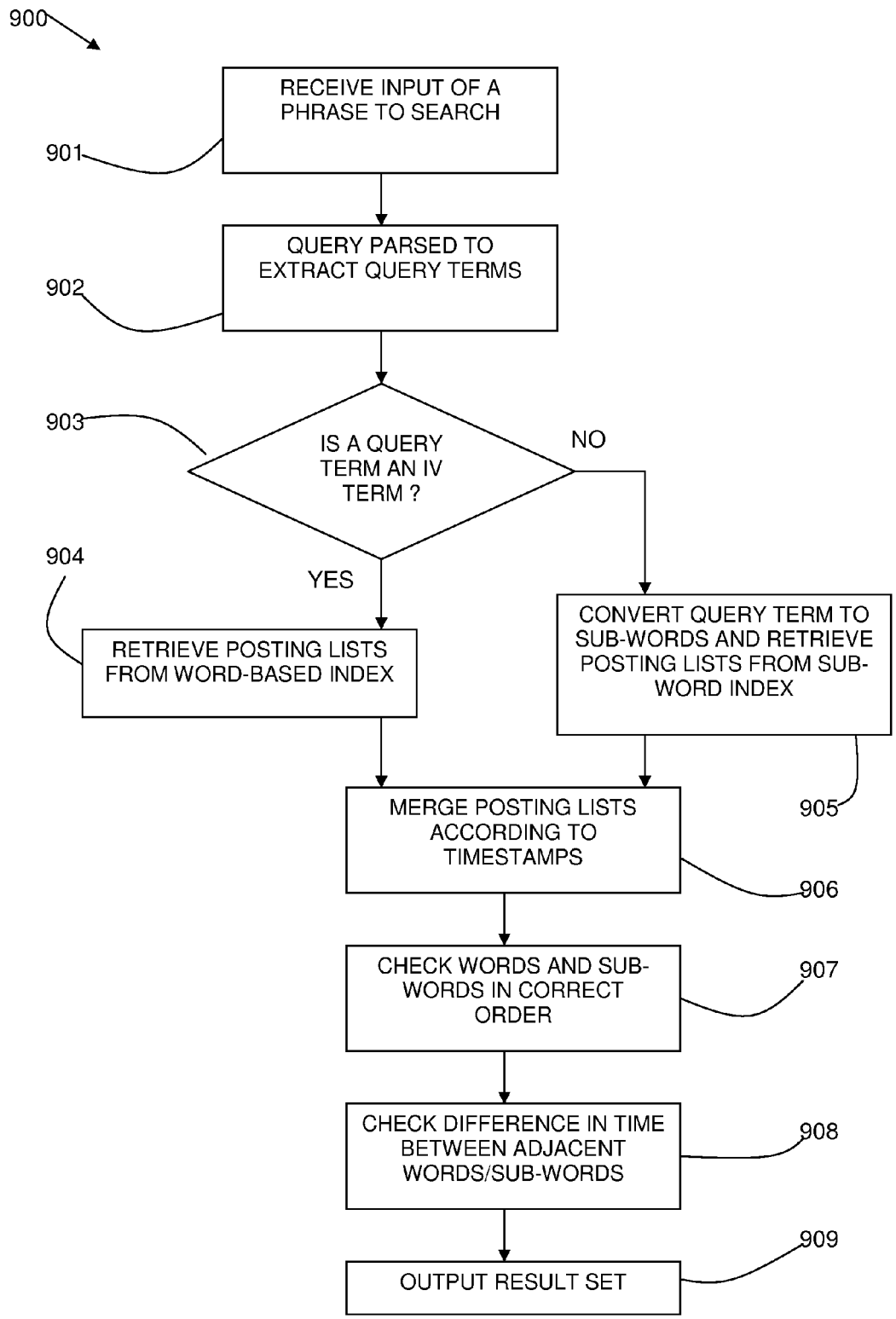
FIG. 9 is a flow diagram of a method of searching the combined word and sub-word index of FIG. 7.

A search algorithm is described with reference to FIG. 9. FIG. 9 shows a flow diagram 900 of a method of searching for a query term in the form of a phrase which may include both IV and OOV terms.

An input of a phrase to search in the speech data is received 901. The query is parsed 902 in order to extract the query words. It is then determined 903 for each query word, if it is an IV term.

For IV query terms, the posting lists are retrieved 904 from the word based index. For non-IV terms, which must be OOV query terms the terms are converted to sub-words and the posting list of each sub-word is retrieved 905 from the sub-word index.

The different posting lists are merged 906 according to the timestamp of the occurrences in order to create results matching the query. It is checked 907 that the words and sub-words appear in the right order according to their begin times, and it is checked 908 that the difference in time between adjacent words/sub-words is reasonable (for example, less that 0.5 seconds).

The set of all the exact matches of the given phrase in the speech corpus is output 909 as the search result.

It should be noted that for keyword searches (and not phrase searches as described above), the indexing model allows use of the classical approaches which:
 handles queries containing only IV terms using the word based index;
 handles queries containing only OOV terms using the sub-word based index; and
 handles queries containing both IV and OOV terms by unifying results retrieved respectively from the word based and the sub-word based indices.

The described searching method can be used by any search engine on speech data including, for example, call center recorded calls, broadcast news, etc.

The method of using the combined word and sub-word index also permits a ranking model based on temporal proximity. In one embodiment of a ranking model, for OOV term ranking, information provided by the phonetic index is used. A higher rank is given to occurrences of OOV terms that contain phones that are close in time to each other. A scoring function is defined that is related to the average gap in time between the different phones.

A keyword k is converted to the sequence of phones $(p_0^k, \ldots, p_l^k)$. The normalized score, $score(k, t_0^k, D)$ of a keyword $k=(p_0^k, \ldots, p_l^k)$, where each $p_i^k$ occurs at time $t_i^k$ with a duration $d_i^k$ in the transcript D, can be defined by the following formula:

$$score(k, t_0^k, D) = 1 - \frac{\sum_{i=1}^{l} 5(t_i^k - (t_{i-1}^k + d_{i-1}^k))}{l}$$

The above formula is just an example of a ranking formula that takes into account the time information extracted from the index, and that can also justifies the need to index timestamp information. This ranking method can be combined with classical ranking methods such as tfidf (term frequency, inverse document frequency), edit distance etc.

A search system combining results of multiple indices may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method of spoken document retrieval by a system using multiple search transcription indices, the method comprising:
receiving an input phrase as a search query formed of query terms;
identifying a first type of query term in the input phrase, wherein the first type includes a query term in a speech recognition vocabulary of the system;
identifying one or more first search transcription indices for searching the first type of query term;
identifying a second type of query term in the input phrase, wherein the second type includes a query term not in the speech recognition vocabulary;
identifying a plurality of second search transcription indices for searching the second type of query term;
receiving at least a first list of results from the one or more first search transcription indices;
receiving plural lists of results from the plurality of second search transcription indices;
ranking results from a phonetic index of the plurality of second search transcription indices based on temporal proximity of phones, wherein the ranking computes a score in accordance with the following expression:

$$\text{score}(k, t_0^k, D) = 1 - \frac{\sum_{i=1}^{l} 5(t_i^k - (t_{i-1}^k + d_{i-1}^k))}{l}$$

where k denotes a keyword having phonemes that may occur in a document transcript D at times $t_i^k$ and having durations $d_i^k$;

combining first scores for a first document from the plural lists of results according to a first method to form a first combined list having a second score for the first document;
combining one or more third scores of a corresponding document from at least the first list of results with the second score according to a second method different from the first method, wherein the second method comprises evaluating timestamps of words and subwords in the document to determine whether the words and subwords are in a correct order and a difference in time between adjacent words and subwords is within a threshold value, wherein the words and subwords in the document correspond to the input phrase; and
outputting search results to a user based in part on the combining the one or more third scores of a corresponding document with the second score.

2. The method as claimed in claim 1, wherein combining the first scores according to the first method comprises using an aggregate sum and OR semantics and combining the one or more third scores according to the second method comprises using an aggregate sum with AND semantics.

3. The method as claimed in claim 1, wherein the plurality of second search transcription indices are generated using different speech transcription methods.

4. The method as claimed in claim 1, wherein the one or more first search transcription indices are taken from the group of: word indices, sub-word word-fragment indices, sub-word phonetic indices, a combination of word and sub-word indices using timestamps, and a combination of word and sub-word indices using offsets.

5. The method as claimed in claim 1, wherein combining the first scores and combining the one or more third scores further comprise using a Threshold Algorithm to simultaneously scan the results from different indices to aggregate retrieved document scores.

6. The method as claimed in claim 5, wherein the Threshold Algorithm uses AND or OR semantics between the indices.

7. The method as claimed in claim 5, wherein combining the first scores and combining the one or more third scores further comprise using a weighted sum with weights allocated for different indices.

8. The method as claimed in claim 1, further comprising scoring results from the received lists of results, wherein the scoring includes an act selected from the group of: scoring results from a word index using weighted term frequency; scoring results for a sub-word index using computed confusion cost of sub-word in a query term; Boolean model scoring; vector space scoring; or edit distance scoring.

9. The method as claimed in claim 1, wherein for a query term formed of a term in the speech recognition vocabulary, one or more word indices and one or more sub-word indices are selected.

10. The method as claimed in claim 1, wherein for a query term formed of a term not in the speech recognition vocabulary, one or more sub-word indices are selected.

11. The method as claimed in claim 1, further comprising:
identifying a third search transcription index for searching at least one of the query terms, wherein the third search transcription index includes words and sub-words; and
receiving a third list of results from the third index.

12. A non-transitory computer-readable storage medium comprising computer-executable instructions that, when executed by a computer, cause the computer to execute acts of:

receiving an input phrase as a search query formed of query terms;

identifying a first type of query term in the input phrase, wherein the first type includes a query term in a speech recognition vocabulary of the system;

identifying one or more first search transcription indices for searching the first type of query term;

identifying a second type of query term in the input phrase, wherein the second type includes a query term not in the speech recognition vocabulary;

identifying a plurality of second search transcription indices for searching the second type of query term;

receiving at least a first list of results from the one or more first search transcription indices;

receiving plural lists of results from the plurality of second search transcription indices;

ranking results from a phonetic index of the plurality of second search transcription indices based on temporal proximity of phones, wherein the ranking computes a score in accordance with the following expression:

$$score(k, t_0^k, D) = 1 - \frac{\sum_{i=1}^{l} 5(t_i^k - (t_{i-1}^k + d_{i-1}^k))}{l}$$

where k denotes a keyword having phonemes that may occur in a document transcript D at times $t_i^k$ and having durations $d_i^k$;

combining first scores for a first document from the plural lists of results according to a first method to form a first combined list having a second score for the first document;

combining one or more third scores of a corresponding document from at least the first list of results with the second score according to a second method different from the first method, wherein the second method comprises evaluating timestamps of words and subwords in the document to determine whether the words and subwords are in a correct order and a difference in time between adjacent words and subwords is within a threshold value, wherein the words and subwords in the document correspond to the input phrase; and outputting search results to a user based in part on the combining the one or more third scores of a corresponding document with the second score.

13. A method of providing a service to a customer over a network for spoken document retrieval, the service comprising:

receiving an input phrase as a search query formed of query terms;

identifying a first type of query term in the input phrase, wherein the first type includes a query term in a speech recognition vocabulary of the system;

identifying one or more first search transcription indices for searching the first type of query term;

identifying a second type of query term in the input phrase, wherein the second type includes a query term not in the speech recognition vocabulary;

identifying a plurality of second search transcription indices for searching the second type of query term;

receiving at least a first list of results from the one or more first search transcription indices;

receiving plural lists of results from the plurality of second search transcription indices;

ranking results from a phonetic index of the plurality of second search transcription indices based on temporal proximity of phones, wherein the ranking computes a score in accordance with the following expression:

$$score(k, t_0^k, D) = 1 - \frac{\sum_{i=1}^{l} 5(t_i^k - (t_{i-1}^k + d_{i-1}^k))}{l}$$

where k denotes a keyword having phonemes that may occur in a document transcript D at times $t_i^k$ and having durations $d_i^k$;

combining first scores for a first document from the plural lists of results according to a first method to form a first combined list having a second score for the first document;

combining one or more third scores of a corresponding document from at least the first list of results with the second score according to a second method different from the first method, wherein the second method comprises evaluating timestamps of words and subwords in the document to determine whether the words and subwords are in a correct order and a difference in time between adjacent words and subwords is within a threshold value, wherein the words and subwords in the document correspond to the input phrase; and outputting search results to a user based in part on the combining the one or more third scores of a corresponding document with the second score.

14. A search system for spoken document retrieval using multiple search transcription indices, the system comprising:

a processor;

a memory containing instructions that, when executed by the processor, adapt the search system to:

receive a search query formed of one or more query terms, determine a first type and a second type of query term by reference to a speech recognition vocabulary, wherein the first type includes a term in a speech recognition vocabulary and the second type includes a term not in the speech recognition vocabulary, identify multiple search transcription indices for searching a first query term based on the type of the first query term, wherein the multiple indices include a first phonetic index and a second index that is different from the first index, rank results from the second index based on temporal proximity of phones, wherein the ranking computes a score in accordance with the following expression:

$$score(k, t_0^k, D) = 1 - \frac{\sum_{i=1}^{l} 5(t_i^k - (t_{i-1}^k + d_{i-1}^k))}{l}$$

where k denotes a keyword having phonemes that may occur in a document transcript D at times $t_i^k$ and having durations $d_i^k$;

receive lists of documents from searching the multiple search transcription indices, for the first query term and for a first document, merge the received lists by evaluating timestamps of words and subwords in the first document to determine whether the words and subwords are in a correct order and a difference in time between adjacent words and subwords is within a threshold value, wherein the words and subwords in the first document correspond to the input phrase, and output search results to a user based in part on the merge of the received lists by evaluating timestamps of words and subwords in the first document.

15. The search system as claimed in claim 14, wherein the multiple indices are taken from the group of: word indices, sub-word word-fragment indices, sub-word phonetic indices, word and sub-word indices using timestamps, and word and sub-word indices using offsets.

16. The search system as claimed in claim 14, wherein the merging of the lists uses a Threshold Algorithm to scan results from different indices for a same document to aggregate document scores for the same document.

* * * * *